United States Patent
Kuo et al.

(10) Patent No.: US 9,183,024 B2
(45) Date of Patent: Nov. 10, 2015

(54) COMPUTER SYSTEM WITH A CLUSTER LOAD BALANCER FOR GRAPHICS PROCESSING AND GRAPHICS PROCESSING METHOD THEREOF

(71) Applicant: Wistron Corporation, New Taipei (TW)

(72) Inventors: Feng-Tseng Kuo, New Taipei (TW); Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 382 days.

(21) Appl. No.: 13/845,110

(22) Filed: Mar. 18, 2013

(65) Prior Publication Data

US 2014/0215462 A1    Jul. 31, 2014

(30) Foreign Application Priority Data

Jan. 25, 2013 (TW) .............................. 102103011 A

(51) Int. Cl.
*G06F 9/455* (2006.01)
*G06F 9/50* (2006.01)

(52) U.S. Cl.
CPC .............. *G06F 9/45533* (2013.01); *G06F 9/50* (2013.01); *G06F 2009/4557* (2013.01)

(58) Field of Classification Search
CPC  G06F 9/45533; G06F 9/50; G06F 2009/4557
See application file for complete search history.

(56) References Cited

U.S. PATENT DOCUMENTS

| | | | |
|---|---|---|---|
| 7,624,118 B2 | 11/2009 | Schipunov et al. | |
| 8,250,182 B2 * | 8/2012 | Frank et al. | 709/219 |
| 8,274,518 B2 * | 9/2012 | Blythe | 345/522 |
| 8,477,145 B2 * | 7/2013 | Vembu et al. | 345/568 |
| 8,629,878 B2 * | 1/2014 | Jackson | 345/522 |
| 8,751,654 B2 * | 6/2014 | Frank | 709/226 |
| 2010/0138475 A1 * | 6/2010 | Frank et al. | 709/203 |
| 2012/0069032 A1 * | 3/2012 | Hansson et al. | 345/522 |
| 2012/0254868 A1 * | 10/2012 | Hansson et al. | 718/1 |
| 2014/0176583 A1 * | 6/2014 | Abiezzi et al. | 345/522 |

FOREIGN PATENT DOCUMENTS

TW    200820023    5/2008

OTHER PUBLICATIONS

"Office Action of Taiwan Counterpart Application", issued on Sep. 26, 2014, p. 1-p. 7, with English translation thereof, in which the listed foreign reference was cited.

\* cited by examiner

*Primary Examiner* — Van Nguyen
(74) *Attorney, Agent, or Firm* — Jianq Chyun IP Office

(57) ABSTRACT

A computer system and a graphics processing method with a cluster load balancer for graphics processing are provided. The computer system includes at least one physical machine (PM) and a graphics processing cluster. The at least one PM includes at least one virtual machine (VM) and a virtual machine manager (VMM). The graphics processing cluster includes graphics processing servers. Each of the graphics processing servers includes graphics processing units (GPUs). A main graphics processing server out of the graphics processing servers receives a graphics processing request provided by the VMM and the VM for assigning the graphics processing request to a minor graphics processing server out of the graphics processing servers. The minor graphics processing server provides a graphics processing result according to the graphics processing request and transmits the graphics processing result to the VM though the VMM.

13 Claims, 4 Drawing Sheets

COMPUTER SYSTEM WITH A CLUSTER LOAD BALANCER FOR GRAPHICS PROCESSING AND GRAPHICS PROCESSING METHOD THEREOF

CROSS-REFERENCE TO RELATED APPLICATION

This application claims the priority benefit of Taiwan application serial no. 102103011, filed on Jan. 25, 2013. The entirety of the above-mentioned patent application is hereby incorporated by reference herein and made a part of this specification.

BACKGROUND

1. Field of the Invention

The disclosure relates to a computer network technique, and more particularly, relates to a computer system having a graphics processing cluster and a graphics processing method thereof.

2. Description of Related Art

With the popularity of mobile network and diversified developments of various network applications, the server groups used in various cloud networks and data centers inevitably have to enhance their own performances to be able to handle the large demand of users. The service types of network applications may be roughly classified into processing services, data access services, and other kinds of common services.

In order to avoid wasting costs due to building too much hardware equipment and unnecessary power consumption, the hardware equipment manufacturers of the cloud networks intend to dynamically adjust supply of each hardware resource according to the cloud computing amount of the users, so that the servers may spread the load of the services by themselves. However, since the users' demand on the image quality and graphics processing of the cloud services gradually increases, and the graphics computing procedure in each physical machine (PM) is only able to perform access and computing through the graphics processing unit (GPU) built in the physical machine, the load relevant to the graphics processing cannot be transmitted to other servers to achieve load balance.

Therefore, to improve the graphics processing function of each physical machine, one can only keep buying new machine hardware and use multiple high-performance GPUs that perform parallel computing to achieve the improvement. In addition, not every kind of services requires high-performance GPUs, and thus the idle GPUs consume considerable power. Therefore, the graphics processing services require a lot of operation costs of the manufacturers.

SUMMARY OF THE INVENTION

The disclosure provides a computer system and a graphics processing method thereof. The computer system makes graphics processing services of a virtual machine no longer be limited to hardware equipment of a local physical machine, thereby reducing hardware limitation of the physical machine. Program coding of the virtual machine does not have to be revised, and the hardware equipment may be expanded according to needs of the graphics processing services of the computer system, thereby reducing costs.

The disclosure provides a computer system which includes at least one physical machine (PM) and a graphics processing cluster. The at least one PM includes at least one virtual machine (VM) and a virtual machine manager (VMM). The graphics processing cluster includes a plurality of graphics processing servers. Each of the graphics processing servers includes a plurality of graphics processing units (GPUs). A main graphics processing server out of the graphics processing servers receives a graphics processing request provided by the VMM and the VM for assigning the graphics processing request to a minor graphics processing server out of the graphics processing servers. The minor graphics processing server generates a graphics processing result according to the graphics processing request and transmits the graphics processing result to the VM though the VMM.

In an embodiment of the disclosure, the main graphics processing server includes a cluster load balancer. The cluster load balancer keeps updating a load scale table and assigns the graphics processing request to the GPUs in the graphics processing servers according to the load scale table.

In an embodiment of the disclosure, each of the graphics processing servers respectively includes a proxy, and the proxy receives a graphics processing request from the cluster load balancer and assigns the graphics processing request to a corresponding GPU. When the graphics processing result is generated, the proxy transmits the graphics processing result to the VM though the VMM.

In an embodiment of the disclosure, the graphics processing servers respectively include a plurality of virtual graphics processing procedures. Each of the virtual graphics processing procedures respectively corresponds to each of the GPUs. Each of the virtual graphics processing procedures receives and records the graphics processing request from the proxy and transmits, through a thin hypervisor, the graphics processing request to a corresponding GPU to perform computing so as to generate the graphics processing result.

From another perspective, the disclosure provides a graphics processing method of a computer system. The computer system includes at least one physical machine (PM) and a graphics processing cluster, wherein the PM includes at least one virtual machine (VM) and a virtual machine manager (VMM). The graphics processing method includes the following steps. A graphics processing request provided by the VMM and the VM is received. The graphics processing request is assigned to one of a plurality of graphics processing servers in a graphics processing cluster. A minor graphics processing server generates a graphics processing result according to the graphics processing request. The graphics processing result is transmitted to the VM though the VMM.

Based on the above, the computer system disclosed in the embodiments of the disclosure revises a procedure flow of the VMM in the PM, so that the graphics processing request of the VM does not use the GPU in the local PM directly but may selectively be performed through a graphics processing cluster in the network. In this way, the graphics processing services of the VM is no longer limited to the hardware equipment of the local PM, thereby reducing the hardware limitation of the PM. The program coding of the VM does not have to be revised, and the hardware equipment may be expanded according to the needs of the graphics processing services of the computer system, thereby reducing costs.

To make the above features and advantages of the invention more comprehensible, embodiments accompanied with drawings are described in detail below.

BRIEF DESCRIPTION OF THE DRAWINGS

The accompanying drawings are included to provide further understanding and are incorporated in and constitute a part of this specification. The drawings illustrate exemplary

DESCRIPTION OF EMBODIMENTS

Figure 1:
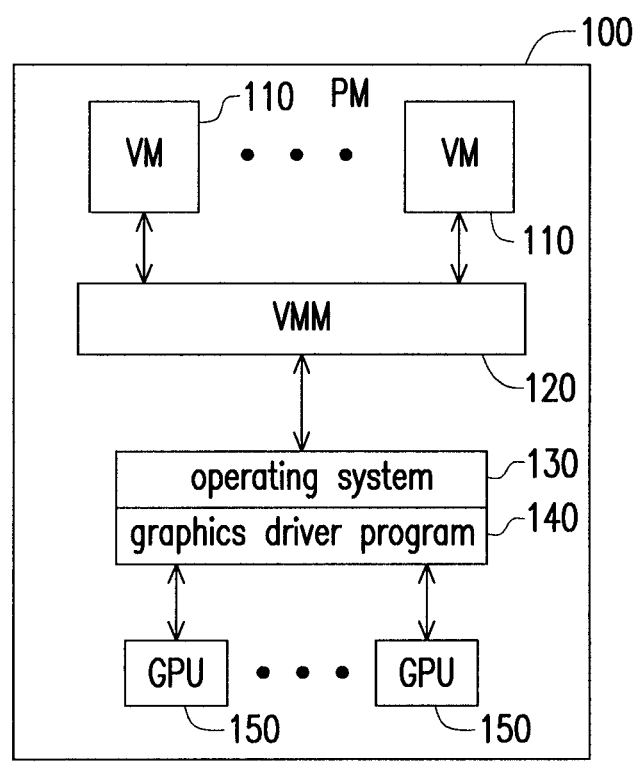
FIG. 1 is a schematic view of a physical machine.

Currently, computer systems that provide network user services are all constructed by physical machines (PM) and virtual machines (VM) as a unit, and software applications of each of the network users are communicated with one of the VMs and perform relevant services. FIG. 1 is a schematic view of a physical machine (PM) 100. The PM 100 may be embodied by a desktop computer or a server. The PM 100 may also be called a virtual machine server. Each PM 100 may operate at least one virtual machine (VM) 110. The PM 100 further includes a virtual machine manager (VMM) 120, an operating system 130, a graphics driver program 140 and a plurality of graphics processing units (GPUs) 150. In some embodiments, the VMM 120 may be a software procedure and operated in the operating system 130. In addition, in some embodiments, the VMM 120 may be accessed directly from hardware.

Generally speaking, when the VM 110 requires hardware resources to perform computing or data access, the VM informs the VMM 120. The VMM 120 may also be called a hypervisor. The VMM 120 appropriately assigns the hardware resources in the local PM 100 to the VM 110 that needs the hardware resources. For example, one or more physical GPUs 150 in the local PM 100 are assigned to the VM 110 that requires the GPUs 150 through the operating system 130 (or direct access of the hardware) and the graphics driver program 140, so that the VM 110 may use the physical GPUs assigned thereto directly to perform graphics processing services. However, in this way, each PM 100 has to be disposed with sufficient GPUs 150 to operate the VM 110 that requires graphics processing services.

Herein, the VM 110 in the embodiments of the disclosure may transmit the graphics processing request to the graphics processing cluster for centralized treatment through the network and the adjusted VMM. The graphics processing cluster may assign a graphics processing server with better performance to perform the graphics processing request and relevant instructions provided by the VM 110 and to transmit the graphics processing result to the corresponding VM 110 to complete graphics processing. Therefore, it is not necessary to dispose a plurality of high-performance GPUs 150 in each PM 100. The graphics processing cluster that performs centralized treatment of the graphics computing services may save power through various ways, thereby spreading the load on the servers, lowering power consumption, reducing hardware limitation of the PM in operating the VM, and allowing the hardware equipment exclusively for performing graphics processing to achieve the best performance. Embodiments that meet the spirits of the disclosure are described below as proof of the invention.

Figure 2:
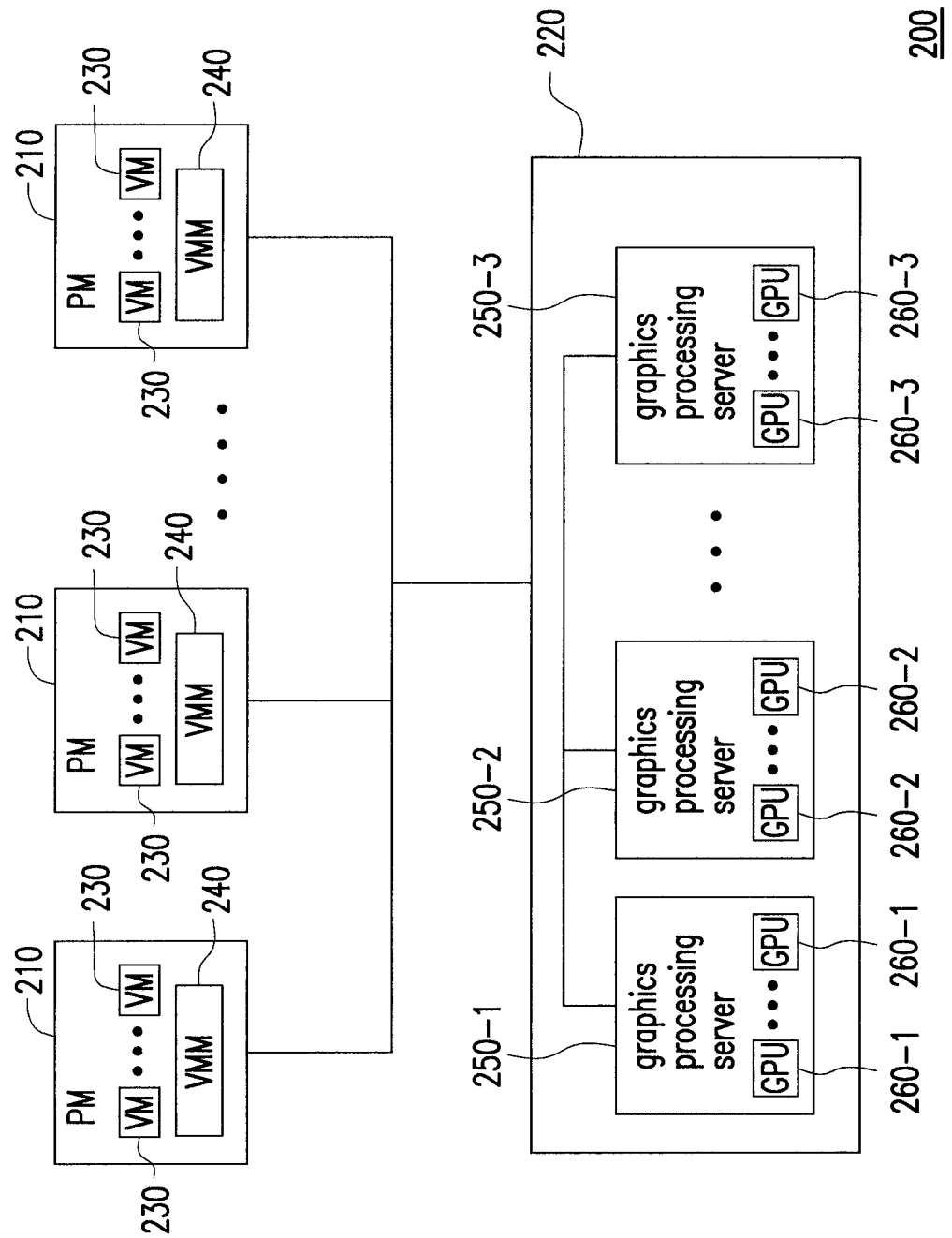
FIG. 2 is a schematic view of a computer system 200 according to an embodiment of the invention.

FIG. 2 is a schematic view of a computer system 200 according to an embodiment of the disclosure. The computer system 200 includes at least one physical machine (PM) 210 and a graphics processing cluster 220. Each PM 210 includes at least one virtual machine (VM) 230 and a virtual machine manager (VMM) 240. The VMM 240 manages the at least one VM 230 in the same PM 210.

Generally speaking, hardware resources of the VM 230 are provided by the VMM 240, and an application programming interface (API) in the VMM 240 searches for a GPU in the local PM by default to perform computing. The present embodiment revises the VMM 240 in the PM and adds a para virtualization aware graphics driver in the VM 230, so that the API does not search for the GPU in the local PM directly but transmits a graphics processing request to the VMM 240, and the VMM 240 decides whether to use the GPU in the local PM or to use a graphics processing cluster 220 at a remote end to perform the graphics processing request. In other words, the VMM 240 of the present embodiment may communicate with and transmit the graphics processing request to the graphics processing cluster 220 through the network.

The graphics processing cluster 220 includes a plurality of graphics processing servers 250-1 to 250-3. Each of the graphics processing servers 250-1 to 250-3 respectively includes a plurality of GPUs 260-1 to 260-3. In the embodiments of the invention, each of the graphics processing servers 250-1 to 250-3 may have, for example, 16 GPUs at most. The number of the GPUs 260-1 to 260-3 illustrated in FIG. 2 simply serves as an example. The graphics processing cluster 220 is a set of the graphics processing servers 250-1 to 250-3. The operating system (or direct access of the hardware) of the graphics processing servers 250-1 to 250-3 of the present embodiment performs a procedure called load balancers. These load balancers may communicate with one another and may select one of the graphics processing servers (such as the graphics processing server 250-1) as the main graphics processing server through various methods of judgment. The load balancer in the main graphics processing server is called a cluster load balancer, or the load balancer may be the load balancing procedure performed in the operating system of the main graphics processing server. The other graphics processing servers (such as the graphics processing servers 250-2 and 250-3) that are not selected serve as minor graphics processing servers, wherein the load balancers therein are called minor load balancers. The above method of judgment may determine which one is the main graphics processing server based on information such as a processing performance and a network address of each of the graphics processing servers 250-1 to 250-3. In some embodiments, one of the graphics processing servers may be the main graphics processing server by default to perform functions of the cluster load balancer, and the other graphics processing servers serve as the minor graphics processing servers and perform functions of the minor load balancers.

An appropriate example is described herein to illustrate the disclosure in detail. When a certain VM 230 has to perform graphics processing, the VM 230 transmits a graphics processing request to the VMM 240 of the local PM so as to gain hardware resources. When the VMM 240 receives the graphics processing request of the VM 230, the VMM 240 computes a first load level about graphics processing resources in the local PM 210, and then the VMM 240 obtains an average load level of all the graphics processing servers 250-1 to 250-3 in the graphics processing cluster 220 to determine if the graphics processing request is to be directly performed in the local PM 210 or if it is better to perform this graphics processing request with the graphics processing cluster 220 at remote network.

If the local PM 210 has sufficient graphics processing resources, or if the average load level of the remote graphics processing cluster 220 is too high to accept other requests, the VMM 240 may use the resources of the PM 210 directly to perform the graphics processing request. However, if the local PM 210 does not have graphics processing resources, the VMM 240 has to use the graphics processing cluster 220 to perform graphics processing through the network. In some embodiments, the VMM 240 may directly transmit the graphics processing request to the graphics processing cluster 220 after receiving the graphics processing request and should not be limited to the process disclosed above.

The graphics processing cluster 220 has a uniform network address for external network equipment, so that each VM 230 and VMM 240 are able to uniformly transmit the graphics processing requests to the main graphics processing server 250-1 in the graphics processing cluster 220. When the VMM 240 determines that the graphics processing request is performed by the graphics processing cluster 220, the VMM 240 transmits the graphics processing request to the uniform network address of the graphics processing cluster 220 through network transmission. The network address is mainly controlled by the main graphics processing server 250-1. After receiving the graphics processing request, the cluster load balancer of the main graphics processing server 250-1 assigns this graphics processing request to a graphics processing server that is able to process this request, such as a server with a lighter load or a server with a particular specification, according to the load level of each of the graphics processing servers 250-1 to 250-3 in the graphics processing cluster 220. The VMM 240 learns the assignment status of the main graphics processing server through the network and record the network address of the graphics processing server that is performing the graphics processing request and the serial number of the graphics processing unit that is actually performing the graphics processing request through ways of redirection settings, so that the VM 230 and the VMM 240 may obtain the result after graphics processing through the network and the graphics processing server directly without through the main graphics processing server 250-1. In other words, a minor graphics processing server that processes the graphics processing request may generate a graphics processing result according to the graphics processing request and transmits the graphics processing result to the VM 230 that has transmitted this request through the VMM 240.

In the present embodiment, the cluster load balancer of the main graphics processing server 250-1 keeps updating a load scale table built therein, thereby keeping learning changes in the load level of each of the graphics processing servers 250-1 to 250-3. For example, the cluster load balancer keeps transmitting a heartbeat signal to the load balancer (or the load balancing procedure) in each of the graphics processing servers 250-1 to 250-3 to monitor an operating status of the graphics processing servers 250-1 to 250-3. The GPUs 260-1 to 260-3 of each of the graphics processing servers 250-1 to 250-3 also the status of acceptance of graphics processing requests (or work requests) at this time, completion of the work requests, load levels of the graphics processing servers 250-1 to 250-3 and so on, so that the cluster load balancer may update the load scale table according to the respondence of the GPUs 260-1 to 260-3. In this way, the cluster load balancer assigns the graphics processing request to the plurality of GPUs 260-1 to 260-3 in the graphics processing servers 250-1 to 250-3 according to the load scale table. In detail, the load scale table may include data of the following columns: setting data of the graphics processing servers 250-1 to 250-3, the number and specification of the GPUs 260-1 to 260-3 in each of the graphics processing servers 250-1 to 250-3, the state of the graphics processing servers 250-1 to 250-3, and the state and/or the weighted value of the GPUs 260-1 to 260-3, but the data are not limited to the above.

Furthermore, the minor load balancers of the minor graphics processing servers 250-2 to 250-3 keep monitoring whether the cluster load balancer of the main graphics processing servers 250-1 is operating. Some of the minor load balancers even backup the load scale table in the cluster load balancer. When the cluster load balancer stops operating, the minor load balancers and other minor load balancers communicate with one another, and one of the minor load balancers is selected as the cluster load balancer based on the above method of judgment. In this way, when the cluster load balancer of the main graphics processing server 250-1 fails to operate, the situation that the entire graphics processing cluster 220 thereby becomes invalid is avoided. In the present embodiment, a plurality of GPUs of the same brand and specification may be disposed in certain graphics processing servers 250-1 to 250-3, so that when the VM 230 processes the graphics processing request, the VM 230 may select the graphics processing servers 250-1 to 250-3 that performs the graphics processing request according to the particular brand (such as Nvidia Corporation, AMD, Inc. or Intel Corporation) and particular specification of the GPUs. In other words, when the graphics processing procedure transmitted by the VM 230 has been set to be performed by a GPU with a particular specification, the cluster load balancer assigns a corresponding graphics processing sever and GPUs with the particular brand and particular specification of the GPUs to perform this graphics processing procedure according to the specification of the graphics processing servers 250-1 to 250-3 and GPUs 260-1 to 260-3. The GPUs with some specification are able to optimize certain graphics processing procedures (like some GPUs designed for 3D image processing engines) or application software, the VM 230 may ask the particular graphics processing servers 250-1 to 250-3 to provide specific graphics processing services for the VM 230 by inputting the brand and type of GPU that the VM 230 intends to use. The method of selecting a certain server for service according to the brand and specification is the so-called service level agreement.

The cluster load balancer of the main graphics processing server 250-1 may perform power management according to actual usage requirements of the VM 230. When the VM 230 has a lower usage requirement, the cluster load balancer may reduce frequency of or directly disable some of the GPUs 260-1 to 260-3 not in use in the graphics processing servers 250-1 to 250-3, thereby lowering power consumption of each of the graphics processing servers 250-1 to 250-3. In contrast, when the VM 230 has an increasing usage requirement and the GPUs 260-1 to 260-3 that are operating are all at a high load level, the GPUs 260-1 to 260-3 that have been disabled or reduced in frequency are enabled or increased in frequency, so as to maintain the operation of the graphics processing cluster 220.

If the actual usage requirement of the VM 230 or the number of connections of the VM 230 is too low or too high, and it is necessary to turn on/turn off the entire graphics processing servers 250-1 to 250-3 in the graphics processing cluster 220, then a class interval method may be used to turn on/turn off the graphics processing servers 250-1 to 250-3. That is, a class interval value is predetermined in the load scale table of the cluster load balancer, and the class interval value is the number of user connections for which the VM 230 may provide graphics processing services. When the number of user connections to the VM 230 that is reduced (i.e. the number of the users decreases) every time is greater than the class interval value, one of the graphics processing servers 250-1 to 250-3 may be turned off entirely to save power. In contrast, when the number of the user connections to the VM 230 that increases (i.e. the number of the users increases) every time is greater than the class interval value, the one of the graphics processing servers 250-1 to 250-3 that have been turned off may be turned on entirely.

Figure 3:
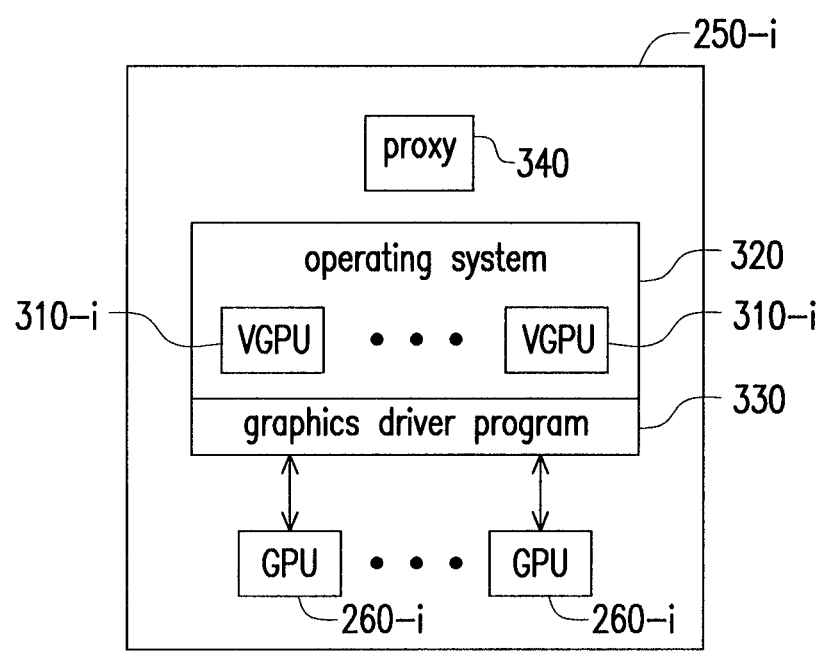
FIG. 3 is a schematic view of each of the graphics processing servers 250-1 to 250-3 depicted in FIG. 2.

FIG. 3 is a schematic view of each of the graphics processing servers 250-1 to 250-3 depicted in FIG. 2. Herein, other detailed components in the graphics processing servers 250-1 to 250-3 are described in detail. A graphics processing server 250-$i$ in FIG. 3 may be any one of the graphics processing servers 250-1 to 250-3. In addition to a plurality of GPUs 260-$i$, the graphics processing server 250-$i$ further includes a proxy 340, an operating system 320, a graphics driver program 330 and a plurality of virtual graphics processing procedures 310-$i$ relative to the plurality of physical GPUs 260-$i$. The virtual graphics processing procedures 310-$i$ in the present embodiment may also be called virtual GPUs (VGPU) 310-$i$. The proxy 340 in the present embodiment may be an application procedure performed in the graphics processing server 250-$i$, and the VGPU 310-$i$ manages and records the operating status of the corresponding physical GPUs 260-$i$. In other words, each of the VGPU 310-$i$ corresponds to each of the GPU 260-$i$, respectively.

The proxy 340 receives a graphics processing request assigned by the cluster load balancer in a main graphics processing unit 260-1 and assigns the graphics processing request to the VGPUs 310-$i$ to which the local GPUs 260-$i$ correspond. Each of the VGPU 310-$i$ receives and records the graphics processing request from the proxy 340 and transmits, through a thin hypervisor operated by an operating system, the graphics processing request to a corresponding GPU to perform computing so as to generate the graphics processing result. When the local GPU 260-$i$ that is assigned generates the graphics processing result, the VGPU 310-$i$ transmits the graphics processing result to the proxy 340, and the proxy 340 transmits the graphics processing result to the VM 230 through the remote VMM 240. Furthermore, after the graphics processing result is generated, the VGPU 310-$i$ may transmit a completion state of the work request to the cluster load balancer of the main graphics processing server 250-1, and the cluster load balancer proceeds to update the load scale table. In addition, it should be noted that even when the physical GPU 260-$i$ is turned off and does not operate, the VGPU 310-$i$ still operates so as to indicate the current state and relevant information of the physical GPU 260-$i$.

The thin hypervisor performs a live task migration of the GPUs. In detail, since the VGPU 310-$i$ informs the cluster load balancer in the main graphics processing server of reception of the work request and completion of performance of the work request to update the load scale table, the cluster load balancer may obtain the state of the graphics processing cluster 220 in real time and computes the average load level of the graphics processing cluster 220.

The formula (1) for computing the load level (such as the first load level) of each of the graphics processing servers 250-1 to 250-3 is as follows:

$$\frac{C_X}{U_X \times VG_X} = LB_X \quad (1)$$

$C_X$ represents the number of connections of the VM 230 that is connected in service in the $X^{th}$ graphics processing server. $U_X$ represents the weighted value of the GPUs in the $X^{th}$ graphics processing server. $VG_X$ represents the number of the idle VGPUs in the $X^{th}$ graphics processing server. $LB_X$ represents the load level of the $X^{th}$ graphics processing server.

The formula (2) for computing the average load level in the graphics processing cluster 220 is as follows:

$$\frac{(C_{1 \sim N})}{(U_{1 \sim N}) \times (VG_{1 \sim N})} = LB_{1 \sim N} \quad (2)$$

N represents the total number of the graphics processing servers 250-1 to 250-3 in the graphics processing cluster 220. $C_{1 \sim N}$ represents the total number of connections of the VM 230 that is connected in service in all the graphics processing servers 250-1 to 250-3. $U_{1 \sim N}$ represents the average weighted value of the GPUs in all the graphics processing servers 250-1 to 250-3. $VG_{1 \sim N}$ represents the total number of the idle VGPUs 310-$i$ in all the graphics processing servers 250-1 to 250-3. $LB_{1 \sim N}$ represents the average load level in the graphics processing cluster 220. The smaller the value of is, the lower the load level is.

When the average load level is too low (lower than 0.4, for example), the cluster load balancer examines the load level of each of the graphics processing servers 250-$i$ one by one, assigns work of the graphics processing server 250-$i$ with the lowest load level to other graphics processing servers that may take this load, takes a snap shot of the current relevant information (such as an operation status, calculation parameters, and sources of instructions of the VM) that is temporarily suspended from operation with the thin hypervisor, and transmits the current relevant information to GPUs inside other graphics processing servers through the network according to instructions of the cluster load balancer. When other graphics processing servers finish receiving the current relevant information, the graphics processing server 250-$i$ with the lowest load level is turned off and transmits information to the cluster load balancer to update the load scale table.

Figure 4:
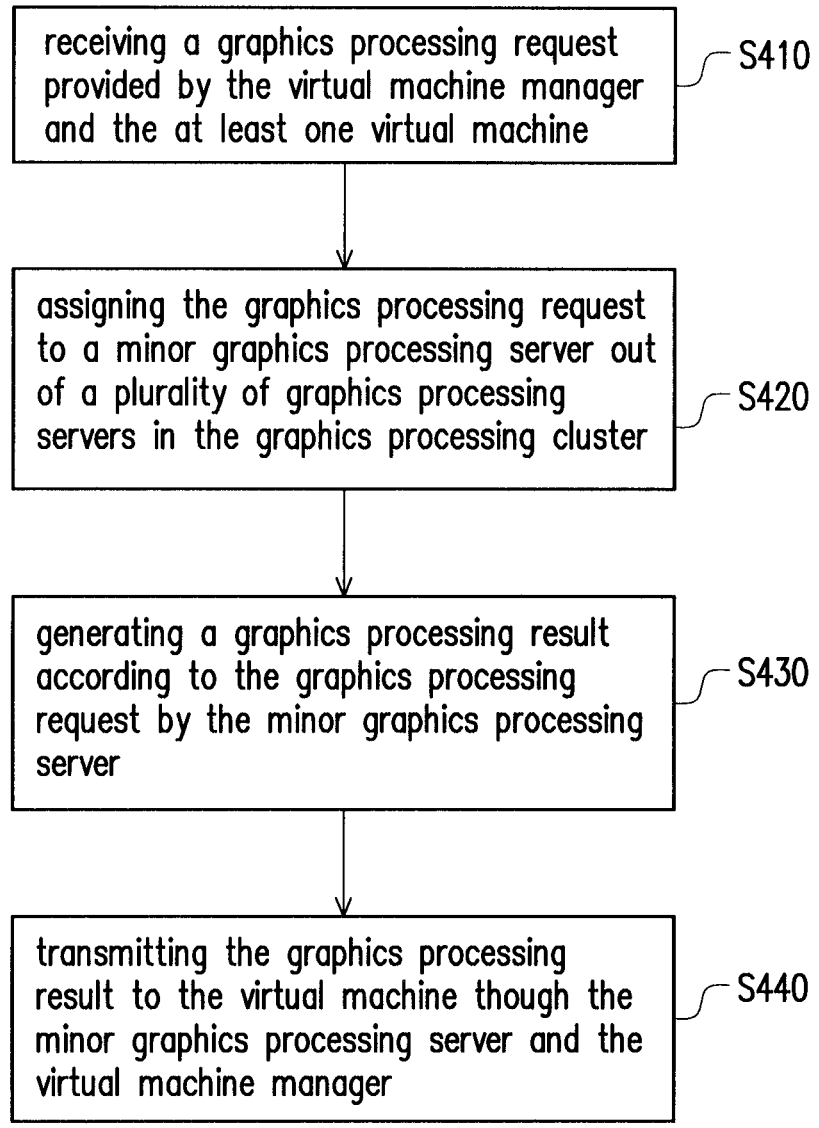
FIG. 4 is a flowchart of a graphics processing method of the computer system 200 according to an embodiment of the invention.

From another perspective, the embodiment of the disclosure further provides a graphics processing method of a computer system. FIG. 4 is a flowchart of a graphics processing method of a computer system 200 according to an embodiment of the invention. Referring to FIGS. 2 and 4, the computer system 200 includes at least one physical machine (PM) 210 and a graphics processing cluster 220, wherein the PM includes at least one virtual machine (VM) 230 and a virtual machine manager (VMM) 240. In Step S110, the cluster load balancer in the main graphics processing server 250-1 receives the graphics processing request provided by the VMM 240 and the VM 230. In Step S220, the graphics processing request is assigned to a minor graphics processing server among a plurality of graphics processing servers in the graphics processing cluster 220. In Step S 230, the minor graphics processing server generates a graphics processing result according to the graphics processing request. In addition, in Step S240, the graphics processing result is transmitted to the corresponding VM 230 through the minor graphics processing servers and the VMM 240. For other detailed steps and processes of the graphics processing method of the computer system 200 and a hardware structure of the computer system 200, please refer to the above embodiments, and details thereof are omitted herein.

In summary of the above, the computer system disclosed in the embodiments of the disclosure revises a procedure flow of the VMM in the PM, so that the graphics processing request of the VM does not use the GPU in the local PM directly but may selectively be executed through a graphics processing cluster in the network. In this way, the graphics processing services of the VM is no longer limited to the hardware equipment of the local PM, thereby reducing the hardware limitation of the PM. Program coding of the VM does not have to be revised, and the hardware equipment may be expanded according to the needs of the graphics processing services of the computer system, thereby reducing costs.

Although the invention has been described with reference to the above embodiments, it will be apparent to one of ordinary skill in the art that variations and modifications to the invention may be made without departing from the spirit and scope of the invention. Accordingly, the scope of the invention will be defined by the attached claims.

What is claimed is:

1. A computer system, comprising:
at least one physical machine comprising at least one virtual machine and a virtual machine manager; and
a graphics processing cluster comprising a plurality of graphics processing servers, each of the graphics processing servers comprising a plurality of graphics processing units,
wherein a main graphics processing server out of the graphics processing servers receives a graphics processing request provided by the virtual machine manager and the at least one virtual machine, the main graphics processing server comprising a cluster load balancer, the cluster load balancer assigning the graphics processing request to a minor graphics processing server out of the graphics processing servers according to a load scale table, and the minor graphics processing server generates a graphics processing result according to the graphics processing request and transmits the graphics processing result to the at least one virtual machine through the virtual machine manager,
wherein the cluster load balancer keeps updating the load scale table and assigns the graphics processing request to the graphics processing units in the graphics processing servers according to the load scale table, and
wherein the cluster load balancer comprises a class interval value and calculates the number of user connections that are performing the graphics processing request in the graphics processing cluster, and when the number of the user connections is reduced by a number greater than the class interval value, one of the graphics processing servers is turned off, and when the number of the user connections increases by a number greater than the class interval value, one of the graphics processing servers that have been turned off is turned on.

2. The computer system according to claim 1, wherein when the virtual machine manager receives the graphics processing request of the at least one virtual machine, the virtual machine manager computes a first load level of the at least one physical machine, and the virtual machine manager obtains an average load level of the graphics processing cluster through the main graphics processing server to determine if the graphics processing request is to be performed by the at least one physical machine or by the graphics processing cluster.

3. The computer system according to claim 1, wherein the load scale table comprises setting data of the graphics processing servers, the number and specification of the graphics processing units in the graphics processing servers, the state of the graphics processing servers, and the state and/or the weighted value of the graphics processing units in the graphics processing servers.

4. The computer system according to claim 1, wherein the graphics processing servers respectively comprise a proxy, the proxy receives the graphics processing request from the cluster load balancer and assigns the graphics processing request to the corresponding graphics processing units, and when the graphics processing result is generated, the proxy transmits the graphics processing result to the at least one virtual machine through the virtual machine manager.

5. The computer system according to claim 4, wherein the graphics processing servers respectively comprise a plurality of virtual graphics processing procedures, each of the virtual graphics processing procedures corresponds to each of the graphics processing units, and each of the virtual graphics processing procedures receives and records the graphics processing request from the proxy and transmits, through a thin hypervisor, the graphics processing request to the corresponding graphics processing unit to perform computing so as to generate the graphics processing result.

6. The computer system according to claim 1, wherein when the graphics processing procedure transmitted by the virtual machine has been set to be performed by a graphics processing unit with a particular specification, the cluster load balancer assigns the corresponding graphics processing servers and graphics processing units to perform the graphics processing procedure according to the particular specification of the graphics processing servers mad the graphics processing units.

7. The computer system according to claim 1, wherein the minor graphics processing server comprises a minor load balancer, the minor load balancer keeps monitoring whether the cluster load balancer is operating, and the minor load balancer communicates with other minor load balancers and selects one of the minor load balancers as the cluster load balancer.

8. A computer system, comprising:
at least one physical machine comprising at least one virtual machine and a virtual machine manager; and
a graphics processing cluster comprising a plurality of graphics processing servers, each of the graphics processing servers comprising a plurality of graphics processing units,
wherein a main graphics processing server out of the graphics processing servers receives a graphics processing request provided by the virtual machine manager and the at least one virtual machine for assigning the graphics processing request to a minor graphics processing server out of the graphics processing servers, and the minor graphics processing server generates a graphics processing result according to the graphics processing request and transmits the graphics processing result to the at least one virtual machine through the virtual machine manager,
wherein when the virtual machine manager receives the graphics processing request of the at least one virtual machine, the virtual machine manager computes a first load level of the at least one physical machine, and the virtual machine manager obtains an average load level of the graphics processing cluster through the main graphics processing server to determine if the graphics processing request is to be performed by the at least one physical machine or by the graphics processing cluster,
wherein after the virtual machine manager determines that the graphics processing request is to be performed by the graphics processing cluster, the virtual machine manager transmits the graphics processing request to the main graphics processing server via network transmission, and the virtual machine manager records a network address of the minor graphics processing server that is performing the graphics processing request and the serial numbers of the graphics processing units that are performing the graphics processing request through an assignment of the main graphics processing server so as to obtain the graphics processing result.

9. A graphics processing method of a computer system, the computer system comprising a graphics processing cluster and at least one physical machine that comprises at least one virtual machine and a virtual machine manager, the graphics processing cluster comprising a cluster load balancer, the graphics processing method comprising:
  receiving a graphics processing request provided by the virtual machine manager and the at least one virtual machine;
  assigning the graphics processing request to a minor graphics processing server out of a plurality of graphics processing servers in the graphics processing cluster by the cluster load balancer according to a load scale table;
  generating a graphics processing result according to the graphics processing request by the minor graphics processing server; and
  transmitting the graphics processing result to the at least one virtual machine though the virtual machine manager,
  wherein the cluster load balancer keeps updating the load scale table and assigns the graphics processing request to the graphics processing units in the graphics processing servers according to the load scale table, and
  wherein the cluster load balancer comprises a class interval value and calculates the number of user connections that are performing the graphics processing request in the graphics processing cluster, and when the number of the user connections is reduced by a number greater than the class interval value, one of the graphics processing servers is turned off, and when the number of the user connections increases by a number greater than the class interval value, one of the graphics processing servers that have been turned off is turned on.

10. The graphics processing method according to claim 9, further comprising:
  computing a first load level of the at least one physical machine when the virtual machine manager receives the graphics processing request of the at least one virtual machine and obtaining an average load level of the graphics processing cluster through the main graphics processing server; and
  determining if the graphics processing request is to be performed by the at least one physical machine or by the graphics processing cluster according to the first load level and the average load level.

11. The graphics processing method according to claim 10, wherein the graphics processing servers respectively comprise a plurality of virtual graphics processing procedures, each of the virtual graphics processing procedures corresponds to each of the graphics processing units, and each of the virtual graphics processing procedures receives and records the graphics processing request from the proxy and transmits, through a thin hypervisor, the graphics processing request to the corresponding graphics processing unit to perform computing so as to generate the graphics processing result.

12. A graphics processing method of a computer system, the computer system comprising a graphics processing cluster and at least one physical machine that comprises at least one virtual machine and a virtual machine manager, the graphics processing method comprising:
  receiving a graphics processing request provided by the virtual machine manager and the at least one virtual machine;
  assigning the graphics processing request to a minor graphics processing server out of a plurality of graphics processing servers in the graphics processing cluster;
  generating a graphics processing result according to the graphics processing request by the minor graphics processing server;
  transmitting the graphics processing result to the at least one virtual machine though the virtual machine manager;
  computing a first load level of the at least one physical machine when the virtual machine manager receives the graphics processing request of the at least one virtual machine and obtaining an average load level of the graphics processing cluster through the main graphics processing server;
  determining if the graphics processing request is to be performed by the at least one physical machine or by the graphics processing cluster according to the first load level and the average load level;
  transmitting the graphics processing request to the main graphics processing server in the graphics processing cluster through network transmission when the graphics processing request is determined to be performed by the graphics processing cluster; and
  obtaining the graphics processing result by recording a network address of the minor graphics processing server that is performing the graphics processing request and the serial numbers of the graphics processing units that are performing the graphics processing request with the virtual machine manger through an assignment of the main graphics processing server.

13. The graphics processing method according to claim 12, wherein the cluster load balancer of the main graphics processing server keeps updating the load scale table, and the graphics processing request is assigned to the graphics processing units in the graphics processing servers according to the load scale table.

* * * * *